(No Model.)

C. F. HARTMAN.
HOOK.

No. 324,025. Patented Aug. 11, 1885.

Attest
E. M. Breckinreed
James R. Barber

Inventor
Charles F. Hartman
By his atty.

UNITED STATES PATENT OFFICE.

CHARLES F. HARTMAN, OF KELLER'S CHURCH, PENNSYLVANIA.

HOOK.

SPECIFICATION forming part of Letters Patent No. 324,025, dated August 11, 1885.

Application filed April 11, 1885. (No model.)

*To all whom it may concern:*

Be it known that I, CHARLES F. HARTMAN, of Keller's Church, in the county of Bucks and State of Pennsylvania, have invented a new and useful Improvement in Hooks, of which the following is a specification.

My invention has reference to hooks; and it consists in a peculiar construction of shank and pivoted hook proper, by which the hook is enabled to move through nearly one hundred and eighty degrees before the ring or link hooked thereon may be removed, the hook, when thrown back so as to expose the ring, being adapted to fit into the recessed portion of the shank and cause the opening or slot formed by said hook to lie parallel with the shank or a line connecting the suspending-point of the shank with the pivot of the hook; and, further, forming the shank with a stop, against which the point of the hook rests when in action, to limit the movement of the said hook in the direction opposite to that required to unlatch the link or ring, and in details of construction, all of which are fully set forth in the following specification, and shown in the accompanying drawings, which form part thereof.

Figure 1:
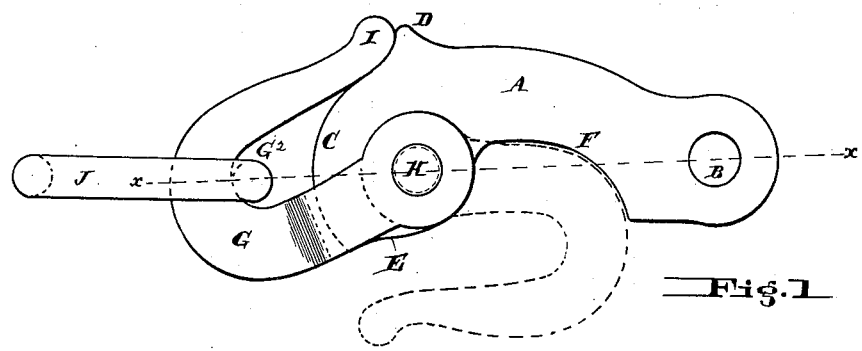
Figure 2:
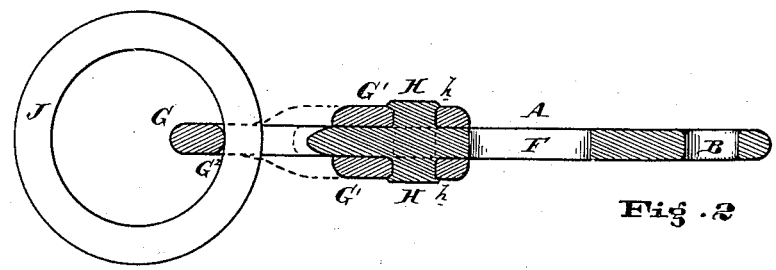
Figure 3:
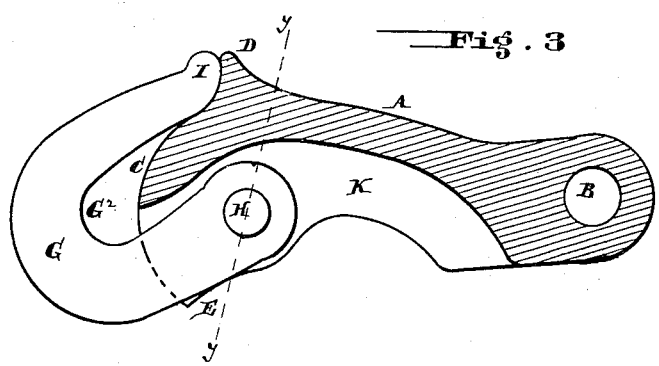
Figure 4:
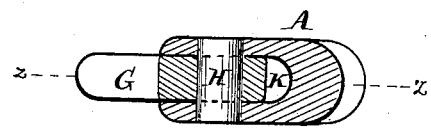

In the drawings, Figure 1 is a side elevation of a hook embodying my improvements. Fig. 2 is a sectional elevation of same on line $x$ $x$. Fig. 3 is a sectional plan view on line $z$ $z$ of a modification of same, and Fig. 4 is a cross-section on line $y$ $y$.

A is the shank, and is made curved or bowed, being recessed at F between the loop B, where the shank is attached to the suspending cord or chain, and the pivot H, by which the hook proper, G, is pivoted to the shank. This shank, upon its end farthest from the loop B, is made circular, as at C, with the pivot H as a center, and has one side cut away at E, while the other is provided with a stop, D.

G is the hook proper, and is made substantially U-shaped, being split to form yoke G', which straddles the shank A, and is provided with apertures or holes which fit over the pivot H, which may be formed by a rivet or cast integral with the shank A. In case the pivot is cast integral with the shank, the yoke G' of the hook G is spread, so as to fit over the pivots, and can be hammered down into the position indicated in Fig. 2, the outer ends being riveted over, as at $h$. The point I of the hook G is so located that it runs upon or very close to the face of the curved part C, and is adapted to rest against the stop D when in action, so as to bring the head $G^2$ of the hook in a substantially direct line with the loop B and pivot H, whereby the tension through these points may be in substantially the same resultant line.

J is the ring or link. When the hook G is thrown back, it is required to move so that its end traverses almost the one-third of a great circle, or about one hundred and twenty degrees, before it leaves the end E of the curved face C, and begins to open the passage-way to the hook, which is only fully opened when the said hook is turned back and received in the recess of the shank, as indicated in dotted lines. This is the only position in which the link can be withdrawn, and in this position the outlet is in the direction from which the tension or pull on the ring J comes. Thus while any sagging of the hook and its chain or cable would not unlatch the ring, yet when the hook is turned back positively to the position indicated in dotted lines the ring would be allowed to freely and automatically pass from out of the slot of the hook.

In place of making the shank flat and the hook provided with a yoke, the reverse may be used, as indicated in Figs. 3 and 4, in which the shank A is provided with a groove or recess, K, and in which the hook is pivoted and allowed to be received, the construction, however, being substantially the same as that shown in Fig. 1. These hooks and shanks are preferably made of malleable castings, though they may be forged of iron or steel, if desired.

Having now described my invention, what I claim as new, and desire to secure by Letters Patent, is—

1. As an improved article of manufacture, a hook consisting of the shank A, having the recessed back F, circular curved part C, and part E cut away, in combination with the pivoted hook G, the point of which is adapted to run close to or against the curved part C, and which when turned back fits into the recess F, substantially as and for the purpose specified.

2. As an improved article of manufacture, a hook consisting of the shank A, having the two pivot-lugs H, a stop, D, formed integral therewith, in combination with the hook G, having yoke G', provided with holes to receive said pivots, the parts being formed of malleable metal and united by hammering the yoke over the pivots, substantially as set forth.

In testimony of which invention I hereunto set my hand.

CHARLES F. HARTMAN.

Witnesses:
R. M. HUNTER,
FRANCIS S. BROWN.